United States Patent

[11] 3,628,636

| [72] | Inventors | Hans Albert Beller<br>Bad Vilbel;<br>Jochen Burgdorf, Offenbach am Main, both of Germany |
|---|---|---|
| [21] | Appl. No. | 8,177 |
| [22] | Filed | Feb. 3, 1970 |
| [45] | Patented | Dec. 21, 1971 |
| [73] | Assignee | International Telephone and Telegraph Corporation<br>New York, N.Y. |
| [32] | Priority | Feb. 5, 1969 |
| [33] | | Germany |
| [31] | | P 19 05 576.6 |

[54] SPOT-TYPE DISC BRAKE
1 Claim, 6 Drawing Figs.

[52] U.S. Cl. .................................................. 188/73.4,
188/73.5, 188/205 A
[51] Int. Cl. .................................................. F16d 65/02

[50] Field of Search ........................................ 188/73.4,
73.5, 73.6, 205 A

[56] References Cited
UNITED STATES PATENTS

| 3,421,602 | 1/1969 | Craske ..................... | 188/205 A |
| 3,245,500 | 4/1966 | Hambling et al. ......... | 188/73.4 X |

FOREIGN PATENTS

| 1,431,049 | 1/1966 | France ..................... | 188/73.4 |

Primary Examiner—George E. A. Halvosa
Attorneys—C. Cornell Remsen, Jr., Walter J. Baum and Paul W. Hemminger ABSTRACT: This spot-type disc brake for vehicles has a fixed carrier extended over a brake disc and brake shoes slidably mounted on the carrier. A slidable frame having sides which engage slots in the carrier transmits the actuating force from an actuating cylinder and brake shoe on one side of the disc to the brake shoe on the other side of the disc.

Inventors
Hans Albert Beller
Jochen Burgdorf
By *Gernot Pagrude*
Agent

Inventors
Hans Albert Beller
Jochen Burgdorf
By
Agent

SPOT-TYPE DISC BRAKE

FIELD OF THE INVENTION

This invention relates to disc brakes for vehicles and particularly to the floating type having an axially fixed rotating disc, an actuator on one side of the disc acting directly on one brake shoe and means for transmitting the actuating force to the brake shoe on the other side of the disc.

SUMMARY OF THE INVENTION

In the design of disc brakes of the floating type it is important that the floating parts be free to move easily in an axial direction and that dirt and corrosion do not reduce this freedom and cause jamming of the floating parts. It is desirable to achieve this without the use of close manufacturing tolerances which add to the cost of the brakes. In addition, the parts of the brake should be easy to assemble and service.

This invention achieves the desirable characteristics mentioned by providing a relatively flat force transmitting frame which supported for slidable movement with respect to the disc by means of axially extending guide surfaces on either side of a fixed brake carrier along which the sides of the frame slide and a guide pin on the side of the frame remote from the actuator which is supported by one of the brake shoes. The actual contact area of the guiding surfaces is small enough so that the actuating force transmitted will be sufficient to overcome any sticking caused by corrosion of the guide surfaces of the guide surfaces.

In a preferred embodiment of the invention the guiding surfaces on the brake carrier are grooves which the frame engage, the width of the grooves being greater than the thickness of the frame part engaging the grooves.

The actuator, which is a separate part and removable without disturbing the other parts of the brake, has slots in its side which engage the insides of an opening in the frame to hold the actuator in position. Thus it is possible to use one type of brake for different methods of operation by inserting a different actuating device for each use, e.g., a hydraulic actuating cylinder of a different piston diameter depending on the actuating force necessary.

Rattling of the frame in the guiding grooves in the brake carrier can be avoided by arranging springs on the frame or the brake carrier which engage the guiding grooves in the brake carrier in such a way that they bear against one wall and press the frame against the opposite groove wall. Instead of using two springs, one spring can be provided with ends which engage both guiding grooves of the brake carrier. This spring forms an open frame whose central part is a U-shaped section bent out of the plane of the two side arms and engaging in an associated groove in the housing of the actuating device. The angle formed by the bentoff central part and the plane of the two side arms in relaxed condition of the spring is larger or smaller than 90°. Since the two side arms of the spring are perpendicular to the U-shaped central part when assembled, the frame and actuator are held in position by the spring so that rattling avoided. In order to prevent movement of the frame with respect to the brake carrier in peripheral direction, one of the side arms of the relaxed spring can be bent off towards the other side arm so that when the spring is assembled it presses the frame to the bottom of the guiding groove which is disposed on the side entering the brake carrier.

Deformation of the brake frame which might impair its displaceability is eliminated by shaping the frame in such a way that one of the two main axes of inertia of the tensile stress diameter of the frame passes through the plane of the force vectors affecting the frame when the brake is actuated. Advantageously the frame ends protruding over the edge of the brake disc can be bent out of the plane of its central part first in radial and then in tangential direction with respect to the brake disc. Thus greater stiffness of the frame is attained and little space is needed in the region above the disc edge.

For holding the frame on the side of the disc opposite to the actuating device the frame provides a pin which engages a recess in the carrier plate of the brake shoe arranged on this side of the disc. Due to this arrangement no additional means are necessary to anchor the frame on this side of the disc. The brake shoe serves as a connecting link between the frame and the brake carrier. When the brake shoes are worn out and replaced, the pins holding the pads are also replaced giving new guide surfaces for the frame on one side of the disc. The retaining springs for the brake shoes are arranged so that they also assist in guiding the frame and preventing rattling.

DESCRIPTION OF THE PREFERRED EMBODIMENTS

Figure 1:
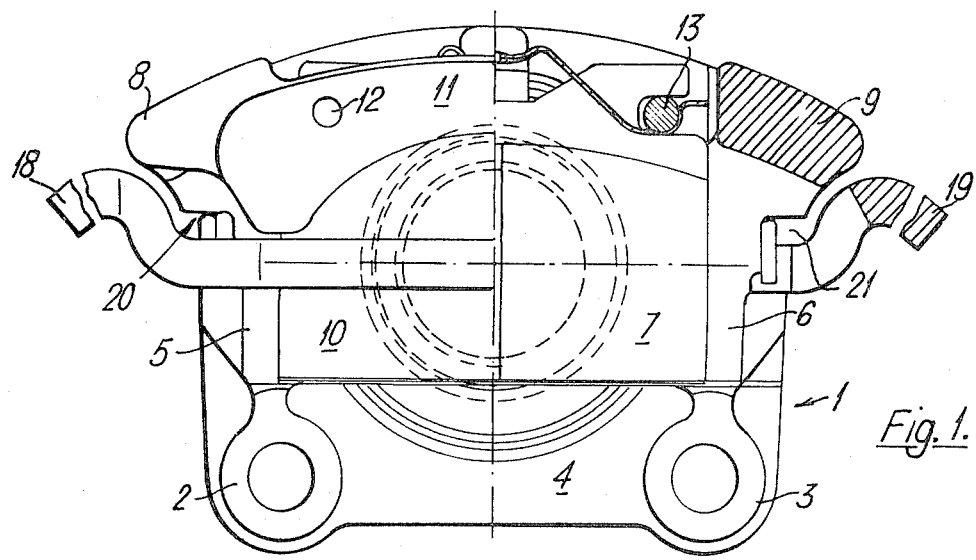
FIG. 1 shows an axial view, partly broken away, of a spot-type disc brake embodying the present invention.
Figure 2:
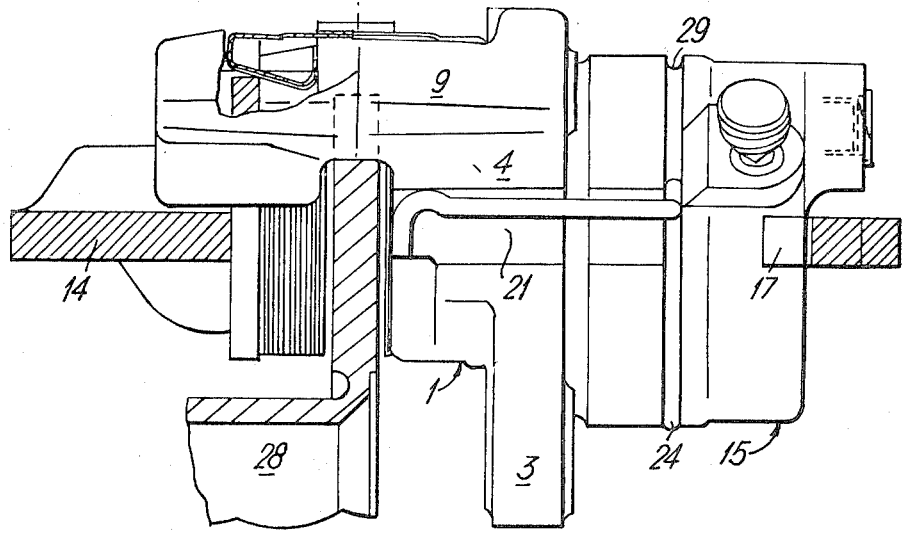
FIG. 2 shows a side view of the disc brake of FIG. 1.
Figure 3:
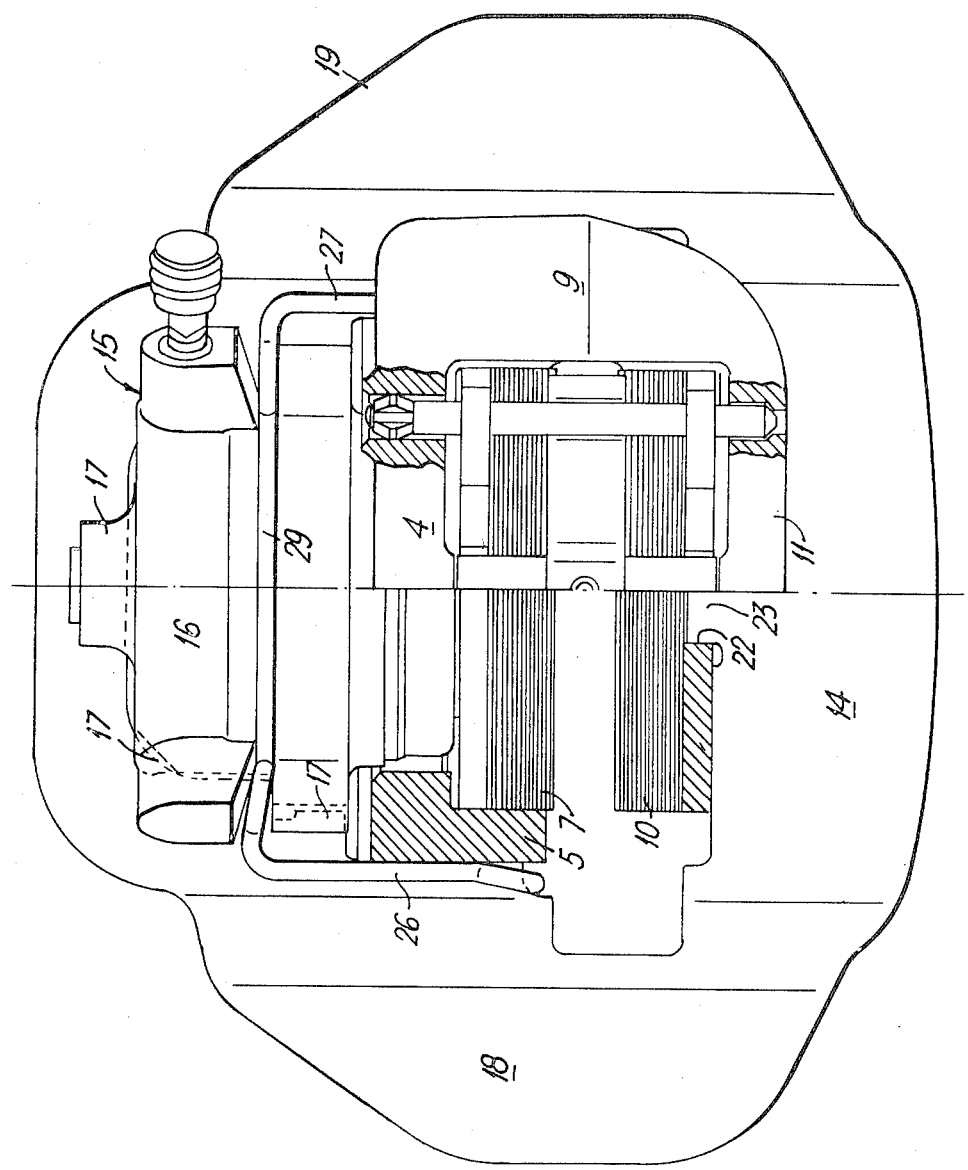
FIG. 3 shows a top view, partly broken away, of the disc brake of FIGS. 1 and 2.

The spot-type disc brake shown in FIGS. 1, 2 and 3 comprises a brake carrier 1, which can be mounted to a part of the wheel suspension or of the vehicle frame by means of bolts passing through holes 2 and 3. The part 4 of the brake carrier which essentially forms a flat plate provides ribs 5 and 6 extending towards the brake disc 28 and serving to receive the frictional forces acting upon the brake shoe 7 arranged between them.

In the region of the disc periphery the brake carrier 1 provides arms 8 and 9 protruding over the disc edge. Between these arms the brake shoe 10 is located and supported in peripheral direction. The ends of the arms 8 and 9 are connected by a crosspiece 11. The brake shoes 7 and 10 are held in radial direction by holding pins 12 and 13 which engage in bores in the plate 4 and in the crosspiece 11 of the brake carrier, and are guided by recesses in the carrier plates of the brake shoes.

A sheet metal frame 14 for transmitting the actuating force to the brake shoe is arranged to slide in axial direction with respect to the brake carrier 1. The frame 14, which may be sheet metal, has a recess on the side facing the plate 4 of the brake carrier. In this recess a hydraulic actuating device 15 is arranged with its piston passing through a central opening in the plate 4 of the brake carrier 1 to act directly upon the brake shoe 7. The housing 16 of the actuating device 15 has recesses 17 which engage the frame 14 to support the end of the actuator 15. The ends 18 and 19 of the essentially flat frame 14 which protrudes over the edge of the disc are bent out of the plane of the central frame part first in radial and then in tangential direction with respect to the brake disc so that they correspond with the outline of the disc. With this shape one of the two main axes of inertia of the tensile stress diameter of the frame passes through the plane of the central frame part so that the actuating force which is transmitted from the frame to the brake shoes and which also acts upon the frame in this plane cannot cause a deformation of the frame.

The plate 4 of the brake carrier 1 provides spaced grooves 20 and 21 extending in an axial direction with respect to the disc for engaging the sides of the frame and guiding the movement of the frame in an axial direction. The widths of the grooves 20 and 21 are larger than the thickness of the frame part engaging the grooves. On the side of the brake disc opposite to the actuating device the frame is supported and positioned by a pin 23 projecting into a recess 22 in the carrier plate of the brake shoe 10. In order to brace the frame against the brake carrier and avoid rattling due to the vibrations and shocks from the vehicle wheel, a spring 24 is arranged to press the frame 14 against one lateral surface of the grooves 20 and 21. The spring 24 formed of round spring wire consists of an open frame with a U-shaped bentoff central part 25 which is inserted in an annular groove 29 in the housing of the actuating device.

Figure 4:
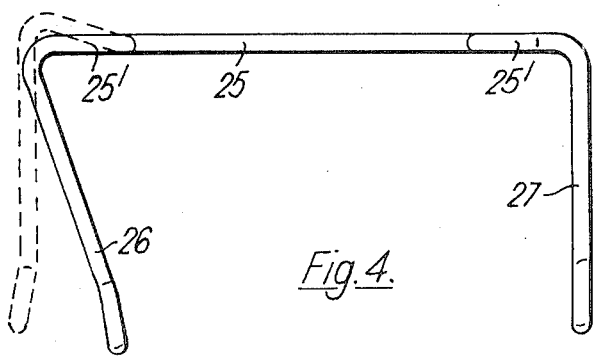
FIG. 4–6 show top, front and side view, respectively, of the spring shown in FIGS. 1, 2 and 3.
Figure 5:
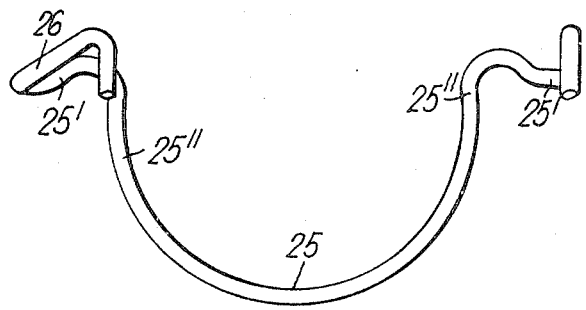
Figure 6:
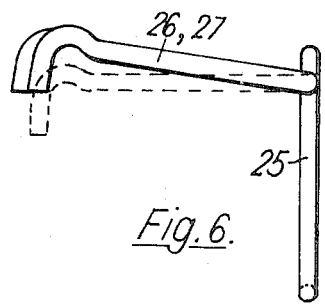

From the central U-shaped part 25 of the spring 24 side arms 26 and 27 are bent off so that when the brake is assembled they: form an angle of 90° with the central part 25, are essentially parallel to each other, are in a plane parallel to the flat central part of the frame 14, and are essentially perpendicular to the brake disc. The ends of the side arms 26 and 27 project into the free space between the frame and the upper sidewalls of the grooves 20 and 21. The ends of the side arms are bent off to form a toroidal elevation and bear against the upper lateral surfaces of the grooves. By this shape of the spring ends an almost point contact surface between spring and groove wall is attained FIGS. 4–6 show the shape of the spring 24 in relaxed condition. As illustrated in FIG. 4, the side arm 26 of the spring 24 is bent off towards the side arm 27. When the spring is mounted, the side arm 26 is bent into a position parallel to the side arm 27 (dotted line) thus causing the spring 24 which is spanned with its central part 25 in the frame and the housing of the actuating device to displace the frame in direction of rotation of the brake disc so that the frame is brought to lie with the side which the disc enters on the bottom surface of the groove 21. Beside, both side arms 26 and 27 of the spring 24 form an obtuse angle with the U-shaped central part 25 as illustrated in FIG. 6 so that the side arms 26 and 27 are brought into a perpendicular position (dotted lines) with respect to the central part 25 when mounted. The prestress resulting therefrom presses the frame 14 against the lower lateral surface of the grooves 20 and 21 and the housing of the actuating device 15 tightly on the frame.

Due to this arrangement a rattling and chattering of the movable parts of the brake is eliminated. A further advantage is in that the guiding of the frame and the slots or grooves 17 in the housing 16 of the actuating device 15 which are engaged by the frame to support it may have relatively large tolerances so that the displaceability of the frame or disassembling of the actuating device is not impaired by dirt or corrosion.

Moreover, the shape of the spring according to the invention simultaneously meets two normally conflicting requirements. On the one hand, such a spring should be made of as thick wire as possible so that its resilience is not adversely influenced when the material wears due to corrosion. On the other hand, the spring should have a force-displacement characteristic as flat as possible, i.e., with increasing stroke the increase of force should remain low so that differing dimensioning due to manufacturing tolerances will not significantly vary the contact pressure of the spring. This, however, requires a thin wire. The spring according to the invention solves this problem since the portions 25' and 25'' of the central part 25 are subjected to torsional stress when the side arms 26 and 27 are deformed as illustrated in FIGS. 4 and 6 resulting in a lever transmission which gives a flat forcedisplacement characteristic despite a thick wire.

We claim as our invention:

1. A spot-type disc brake comprising:
   a rotatable brake disc;
   a nonrotating brake carrier overlapping the edge of the disc;
   brake shoes on either side of the disc slidably mounted on the carrier;
   an actuator on one side of the disc acting directly on one brake shoe; and
   a floatingly arranged frame protruding over the disc connected to the actuating device to transmit the operating force of the actuating device to the other brake shoe located on the opposite side of the disc;
   the brake carrier containing a pair of grooves on opposite sides thereof perpendicular to the disc for guiding the frame, the width of the grooves being greater than the thickness of the part of the frame guided in the grooves;
   the frame containing a recess in which the actuator is contained, the frame being supported on one side of the disc by the grooves and on the other side of the disc by the other brake shoe;
   the actuator containing recesses on opposite sides thereof perpendicular to the disc to engage the recess of the frame and an annular groove therein parallel to the disc; and
   a spring having a U-shaped central portion engaging the annular groove and a pair of arms extending at substantially 90° from the central portion toward the disc, each of the arms of the spring being disposed in one of the pair of grooves of the carrier to press the frame against one side of the pair of grooves of the carrier.

* * * * *